(12) United States Patent
Stent

(10) Patent No.: US 10,916,030 B2
(45) Date of Patent: Feb. 9, 2021

(54) ADAPTIVE INFRARED LIGHTING FOR FULL VEHICLE CABIN BASED ON OCCUPANCY

(71) Applicant: Toyota Research Institute, Inc., Los Altos, CA (US)

(72) Inventor: Simon A. I. Stent, Cambridge, MA (US)

(73) Assignee: TOYOTA RESEARCH INSTITUTE, INC., Los Altos, CA (US)

(*) Notice: Subject to any disclaimer, the term of this patent is extended or adjusted under 35 U.S.C. 154(b) by 154 days.

(21) Appl. No.: 16/212,768

(22) Filed: Dec. 7, 2018

(65) Prior Publication Data

US 2020/0184669 A1 Jun. 11, 2020

(51) Int. Cl.
G06T 7/70 (2017.01)

(52) U.S. Cl.
CPC ...... *G06T 7/70* (2017.01); *G06T 2207/10152* (2013.01); *G06T 2207/30268* (2013.01)

(58) Field of Classification Search
CPC ............ B60N 2/002; B60N 2002/0268; B60N 2002/0272; B60H 1/00742; G06K 9/00362; H04N 7/183; H04N 7/188
See application file for complete search history.

(56) References Cited

U.S. PATENT DOCUMENTS

| | | | |
|---|---|---|---|
| 5,829,782 A | 11/1998 | Breed et al. | |
| 9,633,318 B2 | 4/2017 | Plante | |
| 2005/0100191 A1 | 5/2005 | Harbach et al. | |
| 2006/0018641 A1* | 1/2006 | Goto ................... | B60R 25/1004 396/4 |
| 2014/0276090 A1 | 9/2014 | Breed | |
| 2015/0077556 A1* | 3/2015 | Reed ..................... | B60N 2/002 348/148 |
| 2018/0244129 A1* | 8/2018 | Whitens ................ | G01J 5/0025 |
| 2019/0039546 A1* | 2/2019 | Elangovan ........ | B60R 21/01512 |

FOREIGN PATENT DOCUMENTS

| | | |
|---|---|---|
| DE | 102014007618 A1 | 11/2015 |
| JP | 2005178576 A | 7/2005 |
| WO | 2018150677 A1 | 8/2018 |

* cited by examiner

*Primary Examiner* — Ross Varndell
(74) *Attorney, Agent, or Firm* — Dinsmore & Shohl LLP

(57) ABSTRACT

A system for selectively activating infrared lights in a vehicle cabin includes a controller comprising a processor and a non-transitory computer readable memory, two or more infrared illumination sources positioned within the vehicle cabin, the two or more infrared illumination sources communicatively coupled to the controller, an imaging device communicatively coupled to the controller and a machine-readable instruction set stored in the non-transitory computer readable memory of the controller. The machine-readable instruction set causes the system to perform at least the following when executed by the processor: receive image data from the imaging device, determine a location of an occupant in the vehicle cabin based on the image data, and activate a first infrared illumination source of the two or more infrared illumination sources that corresponds to the location of the occupant in the vehicle cabin.

17 Claims, 5 Drawing Sheets

ADAPTIVE INFRARED LIGHTING FOR FULL VEHICLE CABIN BASED ON OCCUPANCY

TECHNICAL FIELD

The present specification generally relates to systems and methods for controlling infrared lighting within a vehicle. More specifically, the present specification relates to systems and methods for selectively illuminating a vehicle cabin with infrared light for occupant monitoring and tracking systems by controlling the activation and/or distribution of infrared light throughout the vehicle cabin.

BACKGROUND

Vehicle systems utilize infrared illumination for enabling eye gaze tracking, gesture control interfaces, alertness determinations, or the like. For example, these systems may be employed within a vehicle cabin to capture the gaze direction of the driver to determine an alertness level of the driver, a future action such as a future lane change, or for other occupant monitoring and tracking systems. Additionally, systems configured for receiving gesture control inputs from a driver and/or passenger may include one or more infrared illumination sources. The infrared illumination sources for each of these systems may be activated when the vehicle is turned on. However, in many cases the driver and/or and a few passengers may be present in the vehicle. As a result, providing infrared illumination where there is no occupant may not be necessary. Furthermore, the activation of multiple infrared illumination sources within the vehicle cabin may create uneven distributions of infrared light throughout the vehicle cabin resulting in bright spots (e.g., caused by saturation of the imaging device) that interfere with other systems relying on infrared illumination.

SUMMARY

In one embodiment, a system for selectively activating infrared lights in a vehicle cabin includes a controller comprising a processor and a non-transitory computer readable memory, two or more infrared illumination sources positioned within the vehicle cabin, the two or more infrared illumination sources communicatively coupled to the controller, an imaging device communicatively coupled to the controller and a machine-readable instruction set stored in the non-transitory computer readable memory of the controller. The machine-readable instruction set causes the system to perform at least the following when executed by the processor: receive image data from the imaging device, determine a location of an occupant in the vehicle cabin based on the image data, and activate a first infrared illumination source of the two or more infrared illumination sources that corresponds to the location of the occupant in the vehicle cabin.

In some embodiments, a system for selectively activating infrared lights in a vehicle cabin includes a controller comprising a processor and a non-transitory computer readable memory, two or more infrared illumination sources are positioned within the vehicle cabin, the two or more infrared illumination sources are communicatively coupled to the controller, an occupant sensor configured to detect a location of an occupant within the vehicle cabin, where the occupant sensor is communicatively coupled to the controller, and a machine-readable instruction set stored in the non-transitory computer readable memory of the controller. The machine-readable instruction set causes the system to perform at least the following when executed by the processor: receive one or more signals from the occupant sensor, determine the location of the occupant in the vehicle cabin based on the one or more signals from the occupant sensor, and activate a first infrared illumination source of the two or more infrared illumination sources that corresponds to the location of the occupant in the vehicle cabin.

In some embodiments, a method for selectively activating infrared lights in a vehicle cabin includes receiving, from at least one of an imaging device or occupant sensor, one or more signals indicative of a location of an occupant within the vehicle cabin, determining the location of the occupant in the vehicle cabin based on the one or more signals, and activating a first infrared illumination source of two or more infrared illumination sources positioned within the vehicle cabin that corresponds to the location of the occupant in the vehicle cabin.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
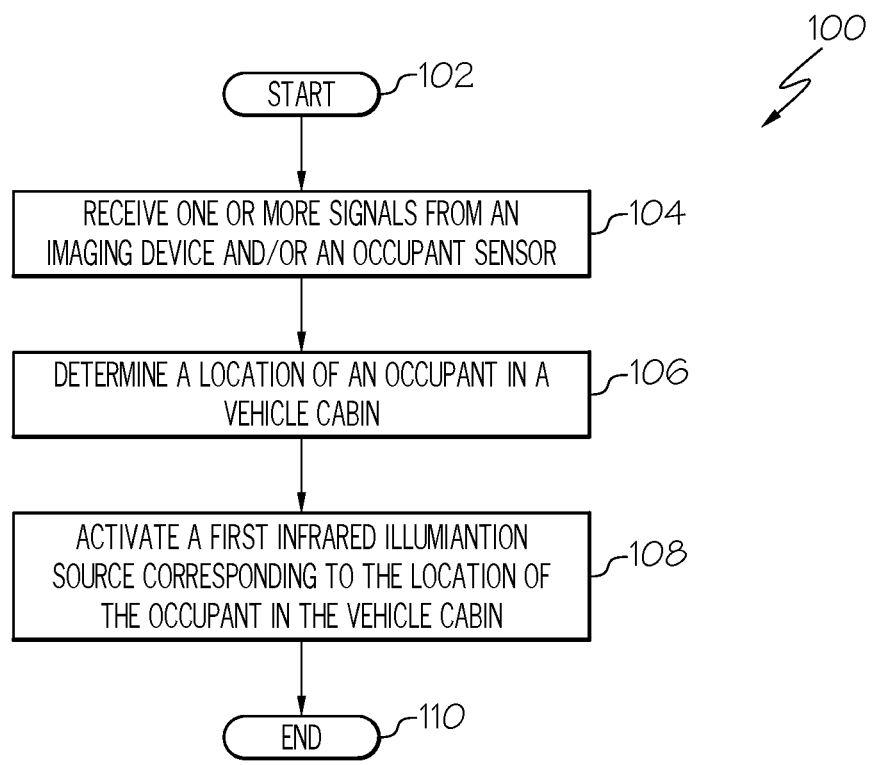
FIG. 1 depicts a flowchart of an example method for selectively activating infrared illumination sources according to one or more embodiments shown and described herein.

Vehicle systems configured for receiving gesture control inputs from a driver and/or passenger may include one or more infrared illumination sources. The infrared illumination sources for each of these systems may be activated when the vehicle is turned on. However, in many cases the driver and/or and a few passengers may be present in the vehicle. As a result, providing infrared illumination where there is no occupant may not be necessary. Furthermore, the activation of multiple infrared illumination sources within the vehicle cabin may create uneven distributions of infrared light throughout the vehicle cabin resulting in bright spots (e.g., caused by saturation of the imaging device) that interfere with other systems relying on infrared illumination.

The embodiments disclosed herein relate to systems and methods for selectively illuminating a vehicle cabin with infrared light for occupant monitoring and tracking systems by controlling the activation and/or distribution of infrared light throughout the vehicle cabin. Vehicles may include multiple systems that implement infrared illumination to enable monitoring and/or tracking of occupants in a vehicle. The activation of multiple infrared illumination sources within a vehicle cabin can inhibit other systems also relying on infrared illumination within the vehicle cabin from capturing clear and quality images. For example, an eye tracking system configured to track the movement of a driver's eyes may be undesirably impacted by infrared light from one or more other infrared illumination sources utilized by other occupant monitoring and tracking systems within the vehicle cabin. This may create an unbalanced distribution across the driver's face causing bright spots to appear within the captured image data of the driver's eye thereby occluding the eyes from view in the image data and inhibiting accurate tracking.

Embodiments of the present disclosure minimize the presence of bright spots by selectively activating and/or controlling the intensity of infrared lights strategically placed throughout the vehicle cabin. In some embodiments, by detecting the presence and the location of passengers in the cabin, only those infrared lights that are needed to illuminate the passenger may be turned on. That is, the infrared illumination sources may only turn on when and where there is a passenger detected, thereby minimizing the amount of IR light in the cabin. In some embodiments, the intensity of the infrared illumination sources may be adjusted based on passenger occupancy and/or bright spots detected within a distribution of infrared light captured by an imaging device. This may reduce bright spots in the resulting images/video, thereby resulting in more accurate occupant monitoring and/or tracking.

Systems and methods for selectively illuminating a vehicle cabin with infrared light for monitoring and/or tracking of an occupant by controlling the activation of infrared illumination sources and the distribution of infrared light throughout the vehicle cabin will now be described in more detail herein.

Turning now to the drawings wherein like numbers refer to like structures, and particularly to FIG. 1, a flowchart 100 of an example method for selectively activating infrared illumination sources within a vehicle cabin is depicted. The flowchart 100 depicts a method that may be implemented by a controller and various other components configured within a vehicle, which will be described in more detail herein. At block 102, the method is initialized. Initialization may occur in response to a vehicle being turned on, when the car is stopped and the door is opened and closed. In some embodiments, the method depicted in flowchart 100 may be continually run. The method may be configured to operate prior to initializing the several infrared illumination sources within the vehicle cabin so that only those that are needed may be activated. At block 104, the controller may receive one or more signals from an imaging device and/or occupant sensors. The imaging device may provide one or more signals corresponding to image data of a vehicle cabin. The occupant sensors may provide one or more signals indicative of the presence of an occupant within the field of detection of the particular occupant sensor. Based on the one or more signals, the controller may then determine a location of an occupant in a vehicle cabin at block 106. For example, an occupant sensor in a driver seat may generate one or more signals indicating the presence of weight indicative of an occupant within the driver seat. As a result, the controller may determine that an occupant is located in the driver seat. At block 108, a first infrared illumination source corresponding to the location of the occupant in the vehicle cabin may be activated. For example, only the infrared illumination sources that correspond to a location(s) of an occupant(s) may be initially activated. At block 110, the controller may end the method until a new trigger event is detected such as one or more of the signals indicating the presence of a new occupant or a change in location of an occupant within the vehicle.

It should be understood that the method depicted and described with reference to FIG. 1 is only one example. Additional methods and systems will be discussed in more detail herein.

Figure 2:
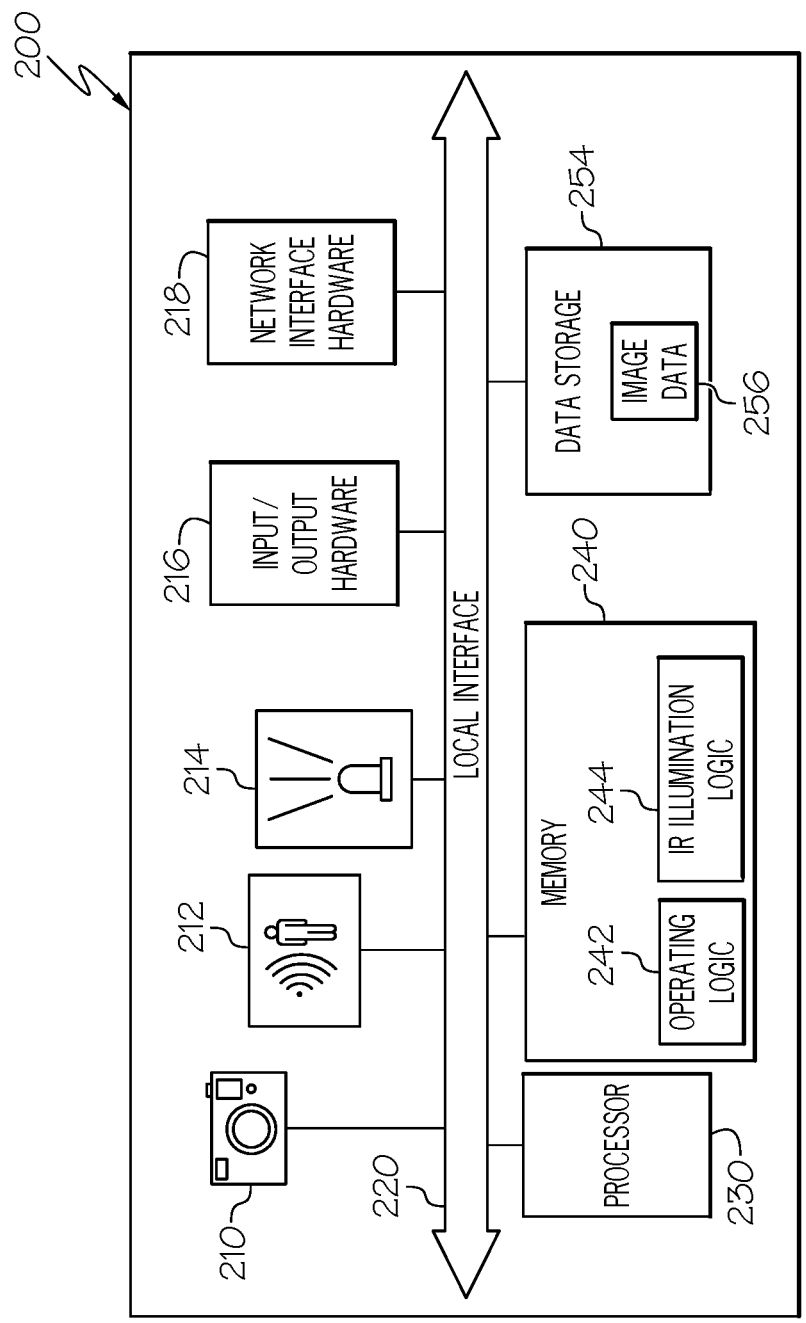
FIG. 2 schematically depicts components of a system for selectively activating infrared illumination sources according to one or more embodiments shown and described herein.

Referring now to FIG. 2, an example schematic of components of a system 200 for controlling infrared light within a vehicle is depicted. The system 200 may be configured within a vehicle for controlling infrared light throughout the vehicle cabin. The system 200 may include an imaging device 210, an occupant sensor 212, an infrared illumination source 214, input/output hardware 216, network interface hardware 218, a processor 230, a memory component 240, and a data storage component 254. These and other components of the system 200 may be communicatively connected to each other via a local interface 220. The local interface 220 may be implemented as a bus or other interface to facilitate communication among the components of the system 200.

The system 200 may include one or more imaging devices 210 communicatively coupled to the controller (e.g., the processor 230 and the memory component 240) via the local interface 220. The imaging device 210 may be a component of the vehicle configured for use by one or more vehicle systems. The imaging device 210 may be any device having an array of sensing devices (e.g., a CCD array or active pixel sensors) capable of detecting radiation in an ultraviolet wavelength band, a visible light wavelength band, and/or an infrared wavelength band. The imaging device 210 may have any resolution. The imaging device 210 may be an omni-direction camera or a panoramic camera. In some embodiments, one or more optical components, such as a mirror, fish-eye lens, or any other type of lens may be optically coupled to the imaging device 210.

The system 200 may also include an occupant sensor 212 communicatively coupled to the controller (e.g., the processor 230 and the memory component 240) via the local interface 220. The occupant sensor 212 may be any device or combination of components capable of outputting one or more signals indicative of the presence or absence of an occupant and optionally the location of the occupant in the vehicle. The occupant sensor 212 may comprise a single pressure sensor provided on or within each vehicle seat. The occupant sensor 212 may also comprise an array of sensors including, but not limited to, an imaging device 210 such as a camera, a motion sensor, a strain gauge, a pressure sensor, a heat sensor, a contact sensor and seat belt restraint sensor to determine the presence and location of an occupant in the vehicle. The occupant sensor 212 may generate one or more sensor signals that when provided to the controller (e.g., the processor 230 and memory component 240), the controller may determine the presence and location an occupant. The occupant sensor 212 is communicatively coupled to the controller (e.g., the processor 230 and memory component 240) providing one or more signals for determining the presence and location an occupant in the vehicle.

Still referring to FIG. 2, the system includes two or more infrared illumination sources 214. The infrared illumination sources 214 may be communicatively coupled to the controller (e.g., the processor 230 and the memory component 240) via the local interface 220. The infrared illumination sources 214 may include one or more infrared emitters, driver circuitry and other hardware for controlling the activation and/or intensity of the infrared illumination source 214. Although only one infrared illumination source 214 is depicted in FIG. 2, it should be understood that two or more infrared illumination sources 214 may be positioned throughout a vehicle cabin to provide infrared light within the cabin for one or more occupant monitoring and tracking systems.

The system 200 may also include input/output hardware 216 and network interface hardware 218 may be communicatively coupled to the controller (e.g., the processor 230 and the memory component 240) via the local interface 220. The input/output hardware 216 may include a monitor, keyboard, mouse, printer, camera, microphone, speaker, and/or other device for receiving, sending, and/or presenting information. The network interface hardware 218 may include any wired or wireless networking hardware, such as a modem, LAN port, Wi-Fi card, WiMax card, mobile communications hardware, and/or other hardware for communicating with a network and/or other devices and systems.

As referred to herein, a "controller" of the system 200 may include a processor 230 and memory component 240. The processor 230 may include any processing component(s) configured to receive and execute programming instructions (such as from the data storage component 254 and/or the memory component 240). The processor 230 may be an electric controller, an integrated circuit, a microchip, a computer, or any other computing device. The processor 230 is communicatively coupled to the other components of the system 200 through the local interface 220 and/or the network interface hardware 218. Accordingly, the local interface 220 may communicatively couple any number of processors 230 with one another, and allow the components coupled to the local interface 220 to operate in a distributed computing environment. Specifically, each of the components may operate as a node that may send and/or receive data. Furthermore, while the embodiment depicted in FIG. 2 includes a single processor 230, some embodiments may include more than one processor 230.

The memory component 240 may be machine-readable memory (which may also be referred to herein as a non-transitory processor readable memory or memory). The memory component 240 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory component 240 may be configured to store operating logic 242 and IR illumination logic 244, each of which may be embodied as a computer program, firmware, or hardware, as an example, and will be described in more detail herein.

Figure 4:
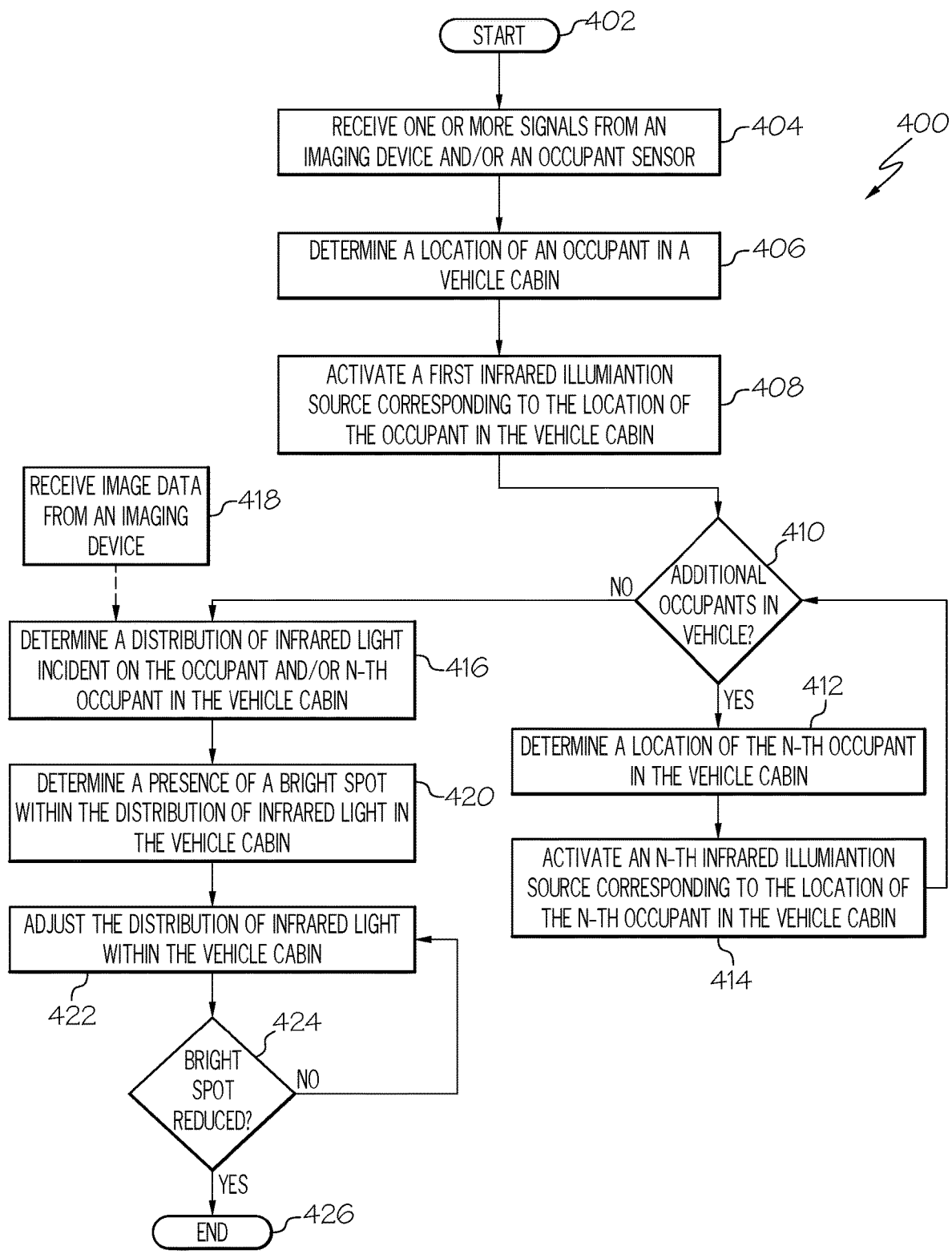
FIG. 4 depicts another example method for selectively activating and controlling the infrared illumination sources within a vehicle cabin according to one or more embodiments shown and described herein.

The operating logic 242 may include an operating system and/or other software for managing components of the system 200. The IR illumination logic 244 may include logic specific to carrying out functions of the system 200. For example, the flowcharts of FIGS. 1 and 4 provide examples of IR illumination logic, which may be codified into a machine-readable instruction set (also referred to as programming instructions) for execution by the processor 230 of the controller of the system 200.

Still referring to FIG. 2, the data storage component 254 may be a volatile and/or nonvolatile digital storage component and, as such, may include random access memory (including SRAM, DRAM, and/or other types of random access memory), flash memory, registers, compact discs (CD), digital versatile discs (DVD), and/or other types of storage components. The data storage component 254 may reside local to and/or remote from the system 200 and may be configured to store one or more pieces of data (e.g., image data 256) for access by the system 200 and/or other components.

As illustrated in FIG. 2, the data storage component 254 stores, for example, image data 256 that is captured by the imaging device 210. In some embodiments, the image data 256 that is captured by the imaging device 210 may be transmitted through a network to a data storage component 254 that is located at a remote location from the system 200.

Figure 3:
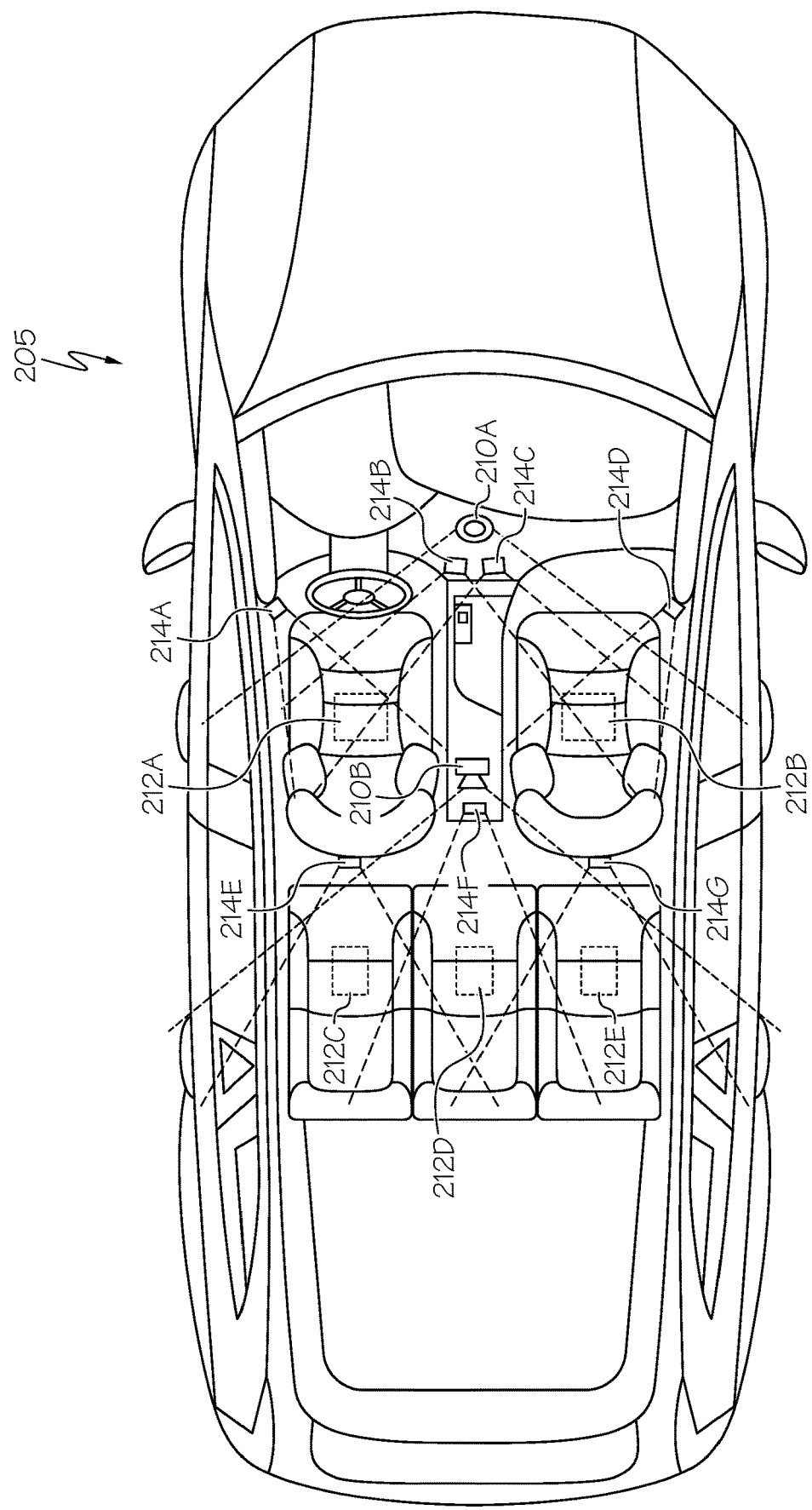
FIG. 3 depicts an illustrative embodiment of a top down view of a vehicle cabin having two or more infrared illumination sources for occupant monitoring and tracking systems in a vehicle according to one or more embodiments shown and described herein.

Turning now to FIG. 3, an illustrative embodiment of a top down view of a vehicle 205 having two or more infrared illumination sources for occupant monitoring and tracking systems in the vehicle cabin is depicted. As briefly discussed above, a vehicle may include more than one monitoring, tracking, or interface system that utilizes infrared illumination sources and imaging devices or other detectors within a vehicle cabin. FIG. 3 provides only one example configuration of such a vehicle 205. The vehicle 205 as depicted includes several infrared illumination sources 214A-214G, two imaging devices 210A and 210B, and occupant sensors 212A-212E. In some embodiments, a first infrared illumination source and a second infrared illumination source may be positioned to illuminate distinct portions of the vehicle cabin. While in some embodiments, a first infrared illumination source and a second infrared illumination source may be positioned such that at least a portion of the infrared light generated overlaps.

The occupant sensors 212A-212E may be positioned within each seat of the vehicle. However, in some embodiments, an imaging device 210 may be utilized to determine the presence and location of occupants in the vehicle. The occupant sensors 212A-212E may generate one or more signals indicative of the presence of an occupant in a particular seat in the vehicle. Additionally, various seating positions within the vehicle cabin may be illuminated by one or more infrared illumination sources 214A-214G.

For example, a monitoring and tracking system such as an eye tracking system may utilize infrared illumination sources 214A and/or 214B and image data from the imaging device 210A. Similarly, a passenger gesture tracking and input system may utilize the infrared illumination sources 214C and/or 214D. That is, a first occupant in the driver seat may be illuminated by the infrared illumination sources 214A and/or 214B. Similarly, a second occupant in the copilot seat may be illuminated by the infrared illumination sources 214C and/or 214D. However, by not controlling the selective activation of or the intensity of the infrared illumination sources 214A-214G, which is described herein, in some instances the infrared light output by the infrared illumination sources 214A and 214B corresponding to the first occupant in the driver seat may also illuminate the second occupant in the copilot seat or another seat within the vehicle. For example, some infrared light from the infrared illumination source 214B, which is intended to illuminate the first occupant in the driver seat may also illuminate a second occupant occupying the copilot seat. This additional infrared light may create an uneven distribution of infrared light incident on the second occupant. The uneven distribution may further include bright spots that obscure features of the first occupant, the second occupant or other occupants from view in image data 256 captured by the imaging device 210A. As used herein, "bright spots" may refer to instances where a portion of or the entire image sensor of an imaging device is saturated. As a result the imaging sensor may need to be adjusted to account for the saturation, however, in some instances detail within subsequent images may be obscured or absent.

Figure 5:
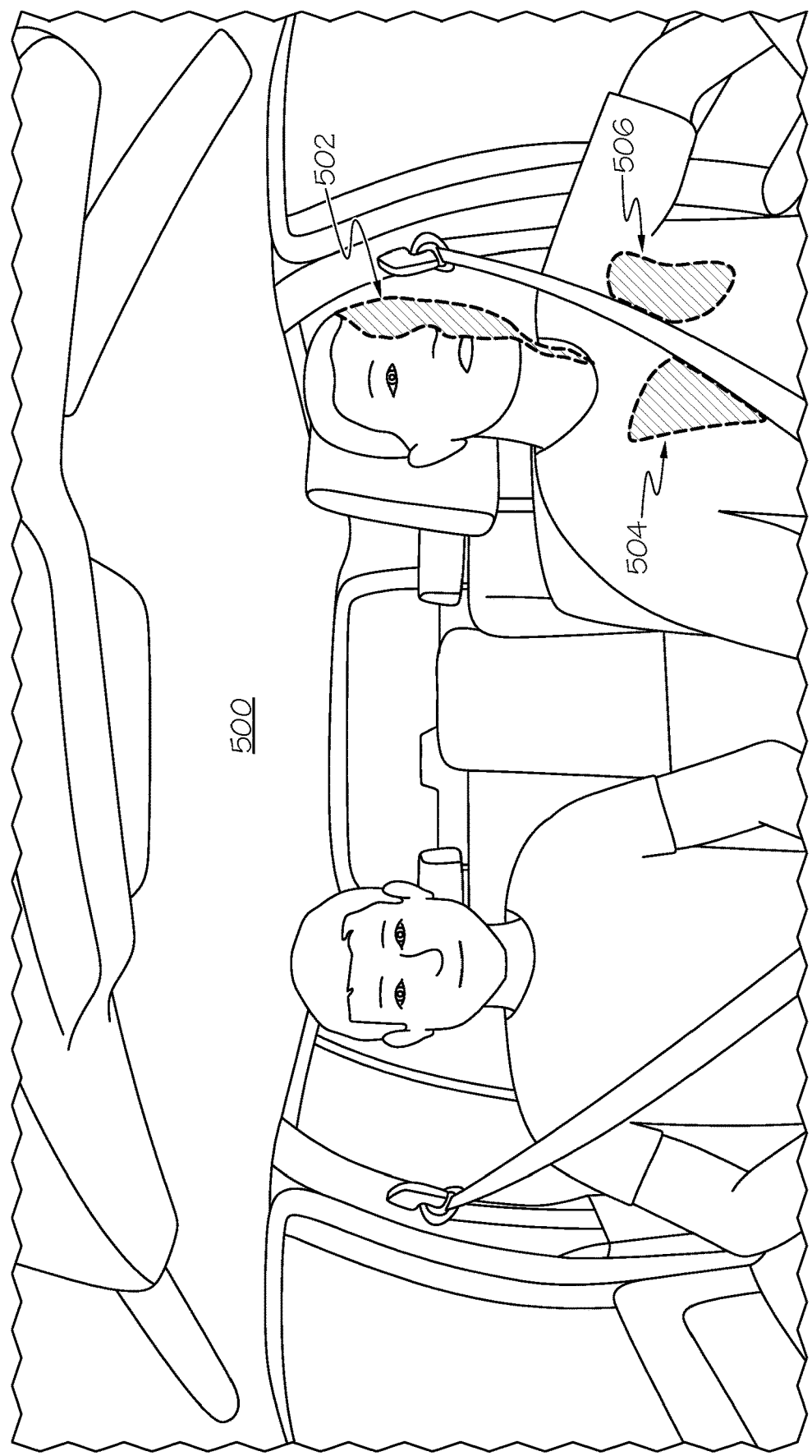
FIG. 5 depicts an illustrative embodiment of image data capturing a distribution of infrared light within a vehicle cabin having bright spots according to one or more embodiments shown and described herein.

However, as described herein, issues arising from the additional and/or unnecessary infrared light within the vehicle cabin may be resolved by selectively activating only those infrared illumination sources that correspond to occupants that are present in the vehicle. In some embodiments, when multiple infrared illumination sources are activated or other external lighting sources are present, the system may adjust the distribution of infrared light within the vehicle cabin by selectively activating one or more of the two or more infrared illumination sources 214A-214G and/or adjusting the intensity of one or more of the two or more infrared illumination sources 214A-214G within the vehicle cabin. FIG. 5, which will be discussed in more detail below, provides an example of an uneven distribution of infrared light that obscures a portion of an occupant within image data captured by the imaging device.

Still referring to FIG. 3, passengers in a second row of seating may further by adversely impacted by infrared light illuminated by infrared illuminated sources corresponding to systems directed to monitoring and tracking an occupant in the driver and/or copilot seat. Additionally, depending on the application and the position of infrared illumination sources 214E-214G, infrared light from each may adversely impact the anticipated distribution of infrared light for the system directed to monitor, track, and/or interface with the individual occupants in the second row of seating.

It should now be understood that, for example, a vehicle cabin having two or more infrared illumination sources utilized by various occupant monitoring and tracking systems where activation of each of the two or more infrared illumination sources is uncontrolled and/or uncoordinated, an undesirable distribution of infrared light within the vehicle cabin may result. However, turning to FIG. 4, an example method for selectively activating and controlling the infrared illumination sources within a vehicle cabin is depicted. A controller having a processor that is communicatively coupled to the two or more infrared illumination sources configured to illumination portions of a vehicle cabin may initialize the method depicted in flowchart 400 at block 402. Upon initialization, at block 402, the controller may receive one or more signals from an imaging device and/or an occupant sensor at block 404. As described above, in some embodiments, an occupant sensor may not be required where an imaging device is configured to provide image data for use in determining the presence and location of occupants in the vehicle. In some embodiments, however, a combination of both may be implemented and, in yet other embodiments, the imaging device is not utilized to provide image data for use in determining the presence and location of occupants in the vehicle.

At block 406, the controller may determine a location of an occupant in a vehicle cabin. The determination may be based on the one or more signals from the imaging device and/or the occupant sensor. At block 408, the controller activates a first infrared illumination source corresponding to the location of the occupant in the vehicle cabin. For example, if the first occupant detected is located in the driver seat, then only the infrared illumination sources corresponding to the location of the driver are activated. In some embodiments, if an occupant monitoring and tracking system that is directed to the occupant in the driver seat includes more than one infrared illumination source, then the controller may activate each of the infrared illumination sources that the particular occupant monitoring and tracking system is configured to utilize.

At block 410, the controller may determine whether there are additional occupants in the vehicle. If so, at block 412, the controller determines the location of the second occupant in the vehicle cabin. Then, at block 414, the controller activates the second infrared illumination source corresponding to the location of the second occupant in the vehicle cabin. The controller may repeat the steps defined in blocks 412 and 414 until all occupants in the vehicle have been identified and the corresponding infrared illumination sources are activated.

If there are no additional occupants in the vehicle, as determined at block 410, then the controller proceeds to execute the step in block 416. At block 416, the controller determines a distribution of infrared light incident on an occupant and/or each of the occupants in the vehicle cabin based on image data received from an imaging device. In some embodiments, the execution of block 416 may require the controller to receive, at block 418, from an imaging device, image data of the vehicle cabin now that the infrared illumination sources are activated.

Referring again to block 416, the controller may determine a distribution of infrared light incident on an occupant and/or each of the occupants in the vehicle cabin by configuring an image of the image data captured by the imaging device into a grid and assigning an intensity value (e.g., a luminous intensity or the like) to portions of the grid. The intensity values may be relative values or absolute values. At block 420, the controller may determine a presence of a bright spot within the distribution of infrared light in the vehicle cabin. For example, the controller may determine a portion of the gird is a bright spot because the intensity value is above a predetermined threshold. The predetermined threshold may be defined as a relative value, for example, that bright spots are locations that have a 10 times greater intensity value than the lowest intensity value within the image. In other embodiments, the predetermined threshold may be defined as an absolute value.

Bright spot (e.g., saturation of an image sensor of the imaging device) may also occur as a result of the presence of external light sources. For example, sunlight may generate undesired amounts of natural or infrared light within the image data. The system may detect these bright spots, as described in more detail below, and adjust, for example, the shutter speed of the imaging device, an intensity of an infrared illumination source, or a combination of both.

In some embodiments, the image data captured by the imaging device may be processed through a neural network trained to identify bright spots of light within an image. Bright spot determination may also be determined based on an analysis of the quality and clarity of an image, for example, whether edges are detectable through portions of the image that are expected to have an edge. In other words, a neural network may be trained on detecting facial features such as eyes, jaw lines, or the like and when a portion of an image of an occupant's face is determined to be missing a feature that should be present then it may be determined that the feature is obscured due to a bright spot present in the image data.

Once a bright spot is determined, the controller, at block 422, may adjust the distribution of infrared light within the vehicle cabin. For example, the controller may increase or decrease the output intensity of an infrared illumination source. The controller may activate one more or more additional infrared illumination sources within the vehicle cabin. The controller may deactivate one more or more additional infrared illumination sources within the vehicle cabin. In some embodiments, adjusting the distribution of infrared light may include configuring the infrared illumination sources to operate in alternating duty cycles. For example, a first infrared illumination source may be configured to operate while a second infrared illumination source is deactivated. The duty cycle may be selected to correspond to the occupant monitoring and tracking system that utilizes the particular infrared illumination source. That is, the eye tracking system may be configured to operate one the same duty cycle that corresponds to the duty cycle defined for its corresponding infrared illumination source(s).

The activation, deactivation, and/or adjustment in output intensity of one or more of the two or more infrared illumination sources within the vehicle cabin may be an iterative process or may be based on a calibration. The calibration may include prior knowledge that identifies a distribution for each of the infrared illumination sources individually within the vehicle cabin. For example, the calibration may indicate which infrared illumination source can provide infrared light to the right half of a driver seat and may further include a profile of the intensity that infrared illumination source can provide. As a result, the system may select and adjust a particular infrared illumination source that may increase or decrease the infrared light in a location having a bright spot (e.g., a portion of the image data that is saturated).

In some embodiments, the process of adjusting the distribution of infrared light in the vehicle cabin may be iterative. As such, after the controller makes an adjustment at block 422, the controller may receive an updated image data and determine whether the bright spot was reduced at block 424. If not, the controller may return to block 422 and perform another adjustment as described above. If so, the controller may end the activation and control of the infrared illumination sources at block 426.

Turning now to FIG. 5, an illustrative embodiment of image data 500 captured by an imaging device is depicted with a distribution of infrared light having bright spots identified by the controller. The line drawing of FIG. 5 represents example image data 500 captured from an imaging device 210A facing the occupants of a vehicle such as the one depicted in FIG. 3. Portions 502, 504, and 506 of the image data 500 are depicted as portions where bright spots are present. For example, a first portion 502 depicts a bright spot that may be identified as such because the right most portion of the driver's face (i.e., the facial features) that should be visible are obscured by the intensity of the infrared light incident on that portion of the occupant. Similarly, portions 504 and 506 have been identified as bright spots as a result of a determination that the intensity value (either relative or absolute) for those portions of the image data are above a predetermined threshold. In such an instance, the system may adjust a first infrared illumination source (e.g., 214A, FIG. 3) by decreasing the output intensity of the first infrared illumination source to decrease the presence of the bright spots in portions 502, 504, and 506.

It should now be understood that embodiments described herein are directed to systems and methods for selectively illuminating a vehicle cabin with infrared light for occupant monitoring and tracking systems by controlling the activation and/or distribution of infrared light throughout the vehicle cabin. The systems and methods described herein may utilize a controller communicatively coupled to an imaging device, two or more infrared illumination sources, and/or an occupant sensor to selectively activate infrared illumination sources corresponding to occupant present in the vehicle cabin. Additionally, the system may determine and actively adjust the distribution of infrared light within the vehicle cabin by identifying bright spots (e.g., saturated areas within the image data) that reduce the quality and clarity of the image data and/or obscure features such as facial features from view of the imaging device. The system minimizes the presence of bright spots by selectively activating infrared lights strategically placed throughout the cabin. For example, by detecting the presence and location of passengers in the cabin, only those infrared lights that are needed to illuminate a passenger may be turned on.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for selectively activating infrared lights in a vehicle cabin comprising:
 a controller comprising a processor and a non-transitory computer readable memory;
 two or more infrared illumination sources positioned within the vehicle cabin, the two or more infrared illumination sources communicatively coupled to the controller; and
 an imaging device communicatively coupled to the controller, wherein the controller is configured to:
  receive image data from the imaging device,
  determine a location of an occupant in the vehicle cabin based on the image data,
  activate a first infrared illumination source of the two or more infrared illumination sources that corresponds to the location of the occupant in the vehicle cabin,
  determine a distribution of infrared light incident on the occupant in the vehicle cabin from the image data,
  determine a presence of a bright spot above a predetermined threshold within the distribution of infrared light incident on the occupant in the vehicle cabin, and
  adjust the distribution of infrared light within the vehicle cabin such that an intensity of the bright spot is reduced by adjusting at least one of the two or more infrared illumination sources.

2. The system of claim 1, wherein the step of adjusting the distribution of infrared light within the vehicle cabin includes increasing or decreasing the intensity of the first infrared illumination source.

3. The system of claim 1, wherein the step of adjusting the distribution of infrared light within the vehicle cabin includes activating one or more additional infrared illumination sources of the two or more infrared illumination sources positioned within the vehicle cabin.

4. The system of claim 1, wherein the step of adjusting the distribution of infrared light within the vehicle cabin includes increasing or decreasing the intensity of at least one of the two or more infrared illumination sources positioned within the vehicle cabin.

5. The system of claim 1, wherein the machine-readable instruction set, when executed, further causes the system to:
   determine a second location of a second occupant in the vehicle cabin based on the image data;
   activate a second infrared illumination source of the two or more infrared illumination sources that corresponds to the second location of the second occupant in the vehicle cabin;
   determine a distribution of infrared light incident on the occupant and the second occupant in the vehicle cabin from the image data;
   determine whether a bright spot above a predetermined threshold value is present in the distribution of infrared light incident on the occupant or the second occupant in the vehicle cabin; and
   adjust the distribution of infrared light within the vehicle cabin such that an intensity of the bright spot is reduced.

6. The system of claim 5, wherein the step of adjusting the distribution of infrared light within the vehicle cabin includes adjusting at least one of the first infrared illumination source or the second infrared illumination source to adjust the distribution of infrared light within the vehicle cabin.

7. The system of claim 1, wherein at least two of the two or more infrared illumination sources are positioned to each illuminate distinct portions of the vehicle cabin.

8. The system of claim 1, wherein at least two of the two or more infrared illumination sources are activated and configured to operate in alternating duty cycles such that the first infrared illumination source is on when a second infrared illumination source is off.

9. A system for selectively activating infrared lights in a vehicle cabin comprising:
   a controller comprising a processor and a non-transitory computer readable memory;
   two or more infrared illumination sources are positioned within the vehicle cabin, the two or more infrared illumination sources are communicatively coupled to the controller; and
   an occupant sensor configured to detect a location of an occupant within the vehicle cabin, the occupant sensor is communicatively coupled to the controller; and
   an imaging device communicatively coupled to the controller, wherein the controller is configured to:
      receive one or more signals from the occupant sensor,
      receive image data from the imaging device,
      determine the location of the occupant in the vehicle cabin based on the one or more signals from the occupant sensor,
      activate a first infrared illumination source of the two or more infrared illumination sources that corresponds to the location of the occupant in the vehicle cabin,
      determine a distribution of infrared light incident on the occupant in the vehicle cabin from the image data,
      determine whether a bright spot above a predetermined threshold value is present in the distribution of infrared light incident on the occupant in the vehicle cabin, and
      adjust the distribution of infrared light within the vehicle cabin such that an intensity of the bright spot is reduced by adjusting at least one of the two or more infrared illumination sources.

10. The system of claim 9, wherein the step of adjusting the distribution of infrared light within the vehicle cabin includes increasing or decreasing the intensity of the first infrared illumination source.

11. The system of claim 9, wherein the step of adjusting the distribution of infrared light within the vehicle cabin includes activating one or more additional infrared illumination sources of the two or more infrared illumination sources positioned within the vehicle cabin.

12. The system of claim 9, wherein the step of adjusting the distribution of infrared light within the vehicle cabin includes increasing or decreasing the intensity of at least one of the two or more infrared illumination sources positioned within the vehicle cabin.

13. The system of claim 9, further comprising an imaging device communicatively coupled to the controller, and wherein the machine-readable instruction set, when executed, further causes the system to:
   determine a second location of a second occupant in the vehicle cabin based the one or more signals from the occupant sensor;
   activate a second infrared illumination source of the two or more infrared illumination sources that corresponds to the second location of the second occupant in the vehicle cabin;
   receive image data from the imaging device;
   determine a distribution of infrared light incident on the occupant and the second occupant in the vehicle cabin from the image data;
   determine whether a bright spot above a predetermined threshold value is present in the distribution of infrared light incident on the occupant or the second occupant in the vehicle cabin; and
   adjust the distribution of infrared light within the vehicle cabin such that an intensity of the bright spot is reduced.

14. The system of claim 13, wherein the step of adjusting the distribution of infrared light within the vehicle cabin includes adjusting at least one of the first infrared illumination source or the second infrared illumination source to adjust the distribution of infrared light within the vehicle cabin.

15. A method for selectively activating infrared lights in a vehicle cabin, the method comprising:
   receiving, from at least one of an imaging device or occupant sensor, one or more signals indicative of a location of an occupant within the vehicle cabin;
   determining the location of the occupant in the vehicle cabin based on the one or more signals;
   activating a first infrared illumination source of two or more infrared illumination sources positioned within the vehicle cabin that corresponds to the location of the occupant in the vehicle cabin;
   determining a distribution of infrared light incident on the occupant in the vehicle cabin from the image data;

determining a presence of a bright spot above a predetermined threshold within the distribution of infrared light incident on the occupant in the vehicle cabin; and adjusting the distribution of infrared light within the vehicle cabin such that an intensity of the bright spot is reduced by adjusting at least one of the two or more infrared illumination sources.

16. The method of claim 15, wherein adjusting the distribution of infrared light within the vehicle cabin includes increasing or decreasing the intensity of at least one of the two or more infrared illumination sources positioned within the vehicle cabin.

17. The method of claim 15, further comprising:

determining a second location of a second occupant in the vehicle cabin based on the one or more signals;

activating a second infrared illumination source of the two or more infrared illumination sources that corresponds to the second location of the second occupant in the vehicle cabin;

receiving, from the imaging device, an image data;

determining a distribution of infrared light incident on the occupant and the second occupant in the vehicle cabin from the image data;

determining a presence of a bright spot above a predetermined threshold within the distribution of infrared light incident on the occupant or the second occupant in the vehicle cabin; and adjust the distribution of infrared light within the vehicle cabin such that an intensity of the bright spot is reduced.

* * * * *